United States Patent [19]

Omae et al.

[11] Patent Number: 4,468,724
[45] Date of Patent: Aug. 28, 1984

[54] METHOD AND APPARATUS FOR CONTROLLING LOAD CURRENT

[75] Inventors: Tsutomu Omae; Toshihiko Matsuda; Makoto Tachikawa, all of Hitachi, Japan

[73] Assignee: Hitachi, Ltd., Tokyo, Japan

[21] Appl. No.: 365,092

[22] Filed: Apr. 2, 1982

[30] Foreign Application Priority Data

Apr. 8, 1981 [JP] Japan .................................. 56-51815
Oct. 5, 1981 [JP] Japan ................................ 56-159294

[51] Int. Cl.³ .......................................... H02P 13/26
[52] U.S. Cl. ...................................... 363/88; 363/128; 318/345 C
[58] Field of Search ............................. 363/17, 84–88, 363/96–98, 128, 132; 318/341, 345 R, 345 C, 345 E, 345 G, 801, 802, 811

[56] References Cited

U.S. PATENT DOCUMENTS

| | | | |
|---|---|---|---|
| 3,746,966 | 7/1973 | Torok et al. | 363/87 |
| 4,063,146 | 12/1977 | Oliver | 363/87 X |
| 4,249,236 | 2/1981 | Omae et al. | 318/345 C |
| 4,282,570 | 8/1981 | Kurosawa et al. | 363/87 |

Primary Examiner—Peter S. Wong
Attorney, Agent, or Firm—Antonelli, Terry & Wands

[57] ABSTRACT

A load DC motor is supplied with a DC current through a converter principally consisting of thyristors controlled by an ON-state control signal. The load current is detected both as to the mean value and the variation in time thereof. The mean value of the load current is calculated based on the load current values detected at the time of the present On-signal and the preceding ON-signal. The difference between the reference value and the mean value of the load current is calculated, and the difference between this differential signal and the variation of the load current is further calculated, so that the timing for providing the ON-signal is calculated based on the resultant differential signal.

18 Claims, 11 Drawing Figures

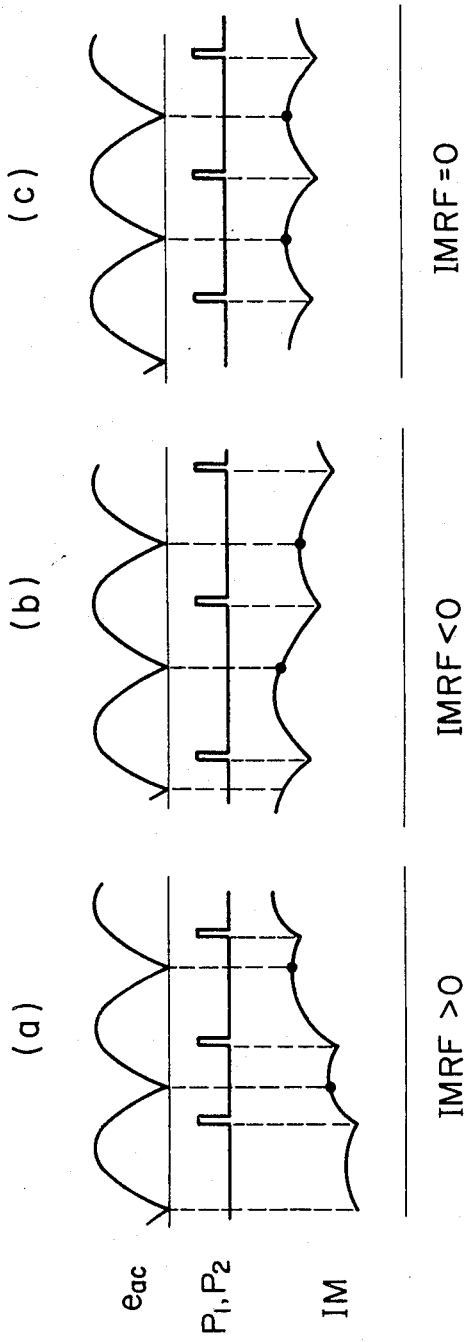

METHOD AND APPARATUS FOR CONTROLLING LOAD CURRENT

BACKGROUND OF THE INVENTION

The present invention relates to a method and apparatus for controlling a load current. It is the general practice in supplying a load current to a load to use a regulating means such as, for example, a convertor principally consisting of thyristors, gate turn-off thyristors, choppers, or the like and the timing of turning on or turning off the regulating means is controlled so that the mean value of the load current coincides with a reference value. It is also common practice to vary the load current in such a way that the variation of the current in time (hereinafter termed simply variation) is limited within a predetermined value.

SUMMARY OF THE INVENTION

The present invention provides a method and apparatus for controlling the load current as mentioned above with satisfactory stability and response speed.

According to the present invention, the load current is controlled with respect to the mean current value and the variation of the current, the latter being calculated from the difference between instantaneous current values detected cyclically at a predetermined timing. The timing of such detection may correspond, for example, to a point in time when the ON-signal or OFF-signal is applied to the regulating means, or to a point in time when the voltage supplied to the regulating means from the power source crosses the zero level.

BRIEF DESCRIPTION OF THE DRAWINGS

FIGS. 4, 7, 8, 10 and 11 are waveform charts useful to explain the present invention.

DESCRIPTION OF THE PREFERRED EMBODIMENTS

Figure 1:
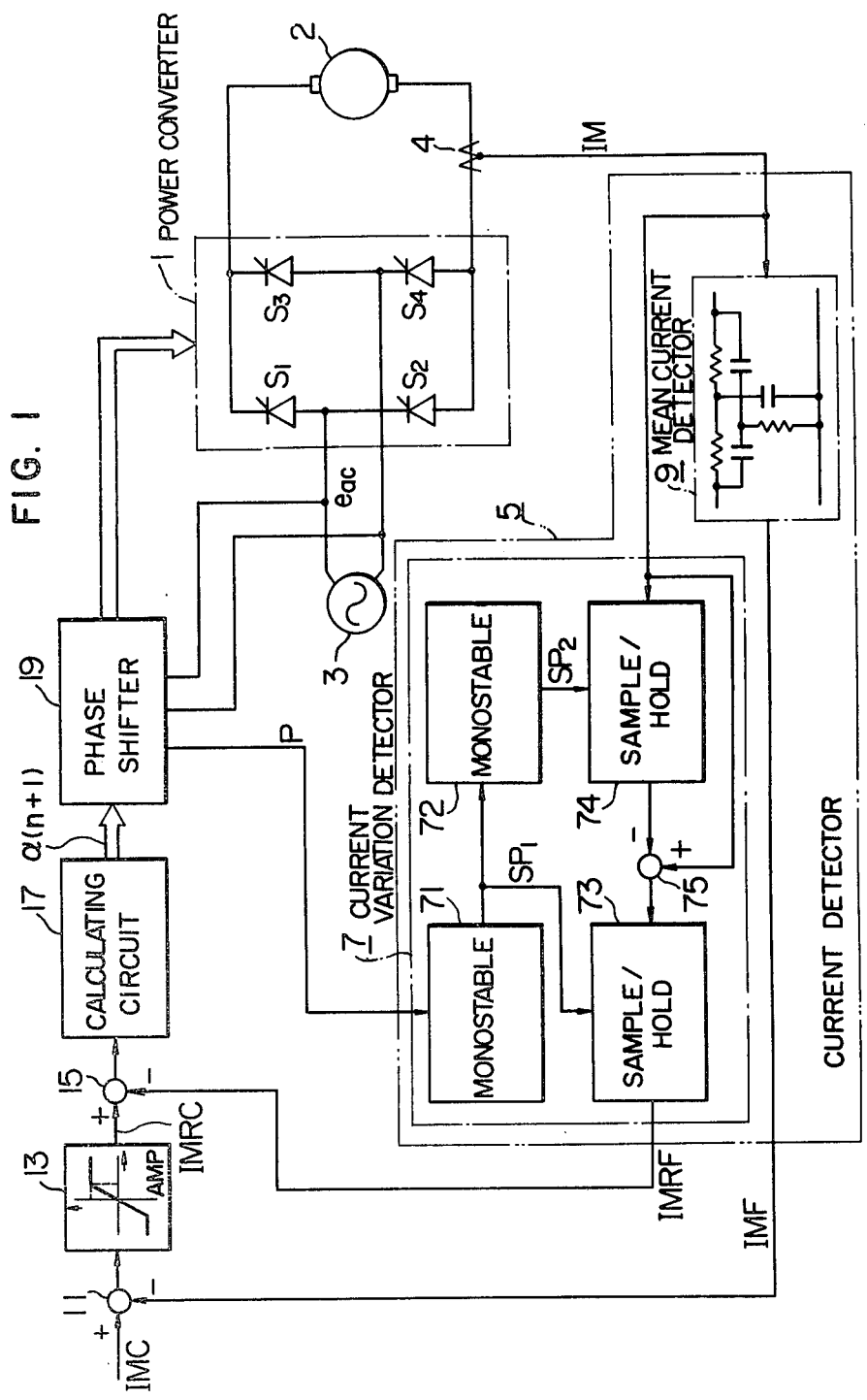
FIGS. 1, 2 and 3 are block diagrams each showing different embodiments of the present invention.
Figure 4:
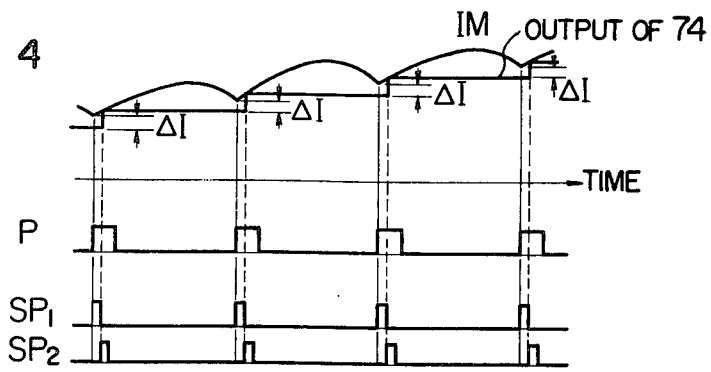
Figure 5:
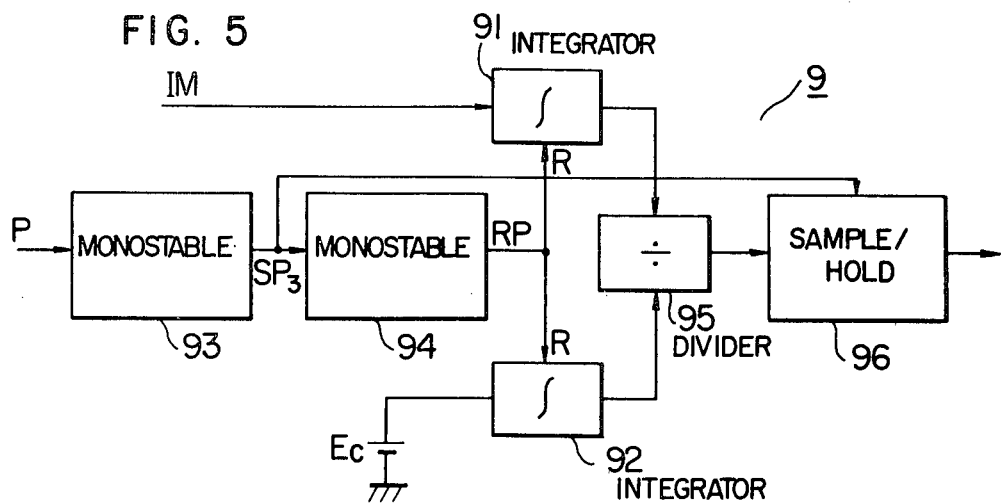
FIGS. 5 and 6 are block diagrams each showing partial circuit arrangements applicable in practicing the present invention.

FIG. 1 is a block diagram showing an embodiment of the present invention, in which a power converter 1 consisting of thyristors S1–S4 arranged in bridge connection is connected at its output terminals to a load 2, e.g. a DC motor, and is also connected at its input terminals to an AC power source 3. Accordingly, the load current can be controlled at a desired value by turning on and off the thyristors S1–S4 in appropriate phase relationship. The load current IM is sensed by a transducer 4 and the output thereof is applied to a current detector 5. The current detector 5 consists of a current variation detector 7 and a mean current detector 9, respectively providing an indication of the variation of the current IMRF and the mean current value IMF based on the instantaneous value of the load current IM received from the transducer 4. There is an adder 11, which negatively adds the detected mean current value IMF to the reference load current value IMC as shown in the figure. The output of the adder 11 is fed to an amplifier 13. The amplifier 13 may have arbitrary characteristics, or preferably may have a characteristic of saturation, where it responds linearly to an input ranging from 0 to $\pm i_o$ to provide an output ranging from 0 to $\pm e_o$, but maintains the output at $\pm e_o$ for the input exceeding $\pm i_o$. There is another adder 15, which negatively adds the detected current variation IMRF to the output of the adder 13, the latter also being used as the reference current variation IMRC. The output of the adder 15 is fed to a calculating circuit 17, which provides an output signal corresponding to the firing phase which is proportional to the input of the circuit 17. In this embodiment, the circuit 17 provides parallel digital signals with a predetermined number of bits. The signals from the calculating circuit 17 are supplied to a digital phase shift circuit 19, which provides an ON-signal in a phase relationship based on the phase of the AC power source 3. The output of the phase shift circuit 19 is supplied to the converter 1. The phase shift circuit 19 may be of arbitrary type, and an example thereof will be described later in connection with FIG. 6. Each time the phase shift circuit 19 sends out an ON-signal to the converter 1, a trigger signal P for calculating the variation is applied to the current variation detector 7. Reference numbers 71 and 72 denote monostable multivibrators. The monostable multivibrator 71 receives the trigger signal P and provides an output pulse SP1 having a certain pulse width in response to the trigger signal. The monostable multivibrator 72 receives the pulse SP1 and provides an output pulse SP2 having a certain pulse width upon expiration of the duration of the pulse SP1. The current variation detector 7 further includes sampling and holding circuits 73 and 74 which sample respective inputs in response to the application of the pulses SP1 and SP2, respectively, and an adder 75 which adds the instantaneous current value sent from the transducer 4 and the output of the sampling and holding circuit 74 in a polarity relationship shown in the figure. The outputs of the sampling and holding circuits 73 and 74 will be described in more detail as follows. Since the trigger pulse P is issued when the On-signal is supplied to the converter 1, causing the output pulse SP1 to be produced, the sampling and holding circuit 74 samples and holds the difference ΔI between the instantaneous load current at a time when the ON-signal is issued to the converter 1 and the current value which is held by the sampling and holding circuit 74 at that time. On the other hand, the sampling and holding circuit 74 samples and holds the input in response to the output pulse SP2 which is provided immediately following the output pulse SP1, and thus when the output pulse SP1 is issued, the sample holding circuit 74 is holding an input value which has been sampled at a time of SP2 produced in response to a trigger pulse R preceding the trigger pulse P which has caused the output pulse SP1. Accordingly, the sampling and holding circuit 73 provides the difference ΔI between the instantaneous current value at the present trigger pulse P and the instantaneous current value at the preceding trigger pulse P; in other words, the difference ΔI between the instantaneous current value at a time when the ON-signal is supplied to the converter 1 and the instantaneous current value at a time when the preceding ON-signal has been supplied to the converter 1. Thus, a signal IMRF corresponding to the current variation is obtained. The timing relationship of the signals is shown in FIG. 4. Although, in the illustrated embodiment, the mean value of the load current is obtained by use of a filter circuit made up of resistors and capacitors as shown, an arrangement may be made as shown in FIG. 5 such that the mean current value between contiguous trigger pulses is calculated. In FIG. 5, integrators 91 and 92 receive a load current value IM and a constant voltage Ec, respectively, and they produce outputs as a result of integration of respective inputs with respect to time. Both integrators 91 and 92 have a reset terminal R, and their outputs become "0" when each reset terminal receives a reset pulse. The outputs of the integrators are fed to a divider 95, which provides an output by dividing the output of the integrator 91 with the output of the integrator 92. Reference numbers 93 and 94 denote monostable multivibrators which are identical to the monostable multivibrators 71 and 72 mentioned previously. The monostable multivibrator 93 receives the trigger pulse P each time the ON-signal is issued to the converter 1, and provides an output pulse SP3 having a certain pulse width in response to the application of the trigger pulse P. The monostable multivibrator 94 provides an output pulse RP having a certain pulse width upon expiration of the duration of the output pulse SP3. There is further provided a sampling and holding circuit 96, which samples and holds the input at a time when the output pulse SP3 is applied. The output RP of the monostable multivibrator 94 is applied to the reset terminals of the integrators 91 and 92. The integrators 91 and 92 carry out time integration for the load current value and the constant value, respectively, in response to the output pulse RP immediately following the ON-signal supplied to the converter 1. The ratio of the integrated outputs is calculated by the divider 95, and the output of the sampling and holding circuit obtained at a time of the subsequent ON-signal indicates the mean value of the current between one ON-signal and the next ON-signal. The mean value detector shown in FIG. 5 is superior to the circuit shown in FIG. 1 in providing a high response mean current value.

Figure 6:
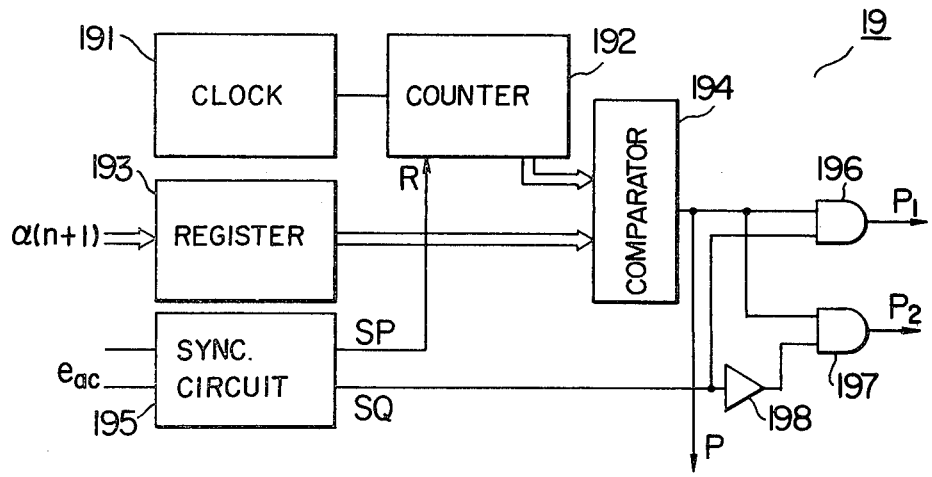

FIG. 6 shows an example of the phase shift circuit 19, in which there are a clock generator 191 which provides clock pulses in a certain frequency and a counter 192 which receives the clock pulses and provides a count at its output. The counter 192 has a reset terminal R, and when a reset signal is applied to this terminal, the counter is cleared and it starts counting from zero. The phase shift circuit 19 further includes a register 193 which stores the phase signal $\alpha(n+1)$ received from the calculating circuit 17, and a comparator 194 which compares the output of the counter 192 with the output of the register 193 and issues an ON-signal to the converter 1 when both outputs coincide with each other. Reference number 195 denotes a synchronizing circuit which receives the voltage $e_{ac}$ of the AC power source 3 and provides an output pulse SP having a certain pulse width each time the $e_{ac}$ crosses the zero level. The synchronizing circuit 195 also provides a rectangular pulse signal SQ having a logical level of "1" during a predetermined half cycle, e.g. the positive half cycle, of the $e_{ac}$. Further included are an AND gate 196 which conducts passes the output of the comparator 194 when the rectangular signal SQ is "1", and an AND gate 197 which passes the output of the comparator 194 when the signal SQ is absent ("0"), i.e. when the inverter 198 provides a "1" output. The output P1 from the AND gate 196 is used as the ON-signal for thyristors S1 and S4, whereas the output P2 from the AND gate 197 is used as the ON-signal for thyristors S2 and S3. The output from the comparator 194 is used as the trigger pulse P mentioned previously.

Figure 7:
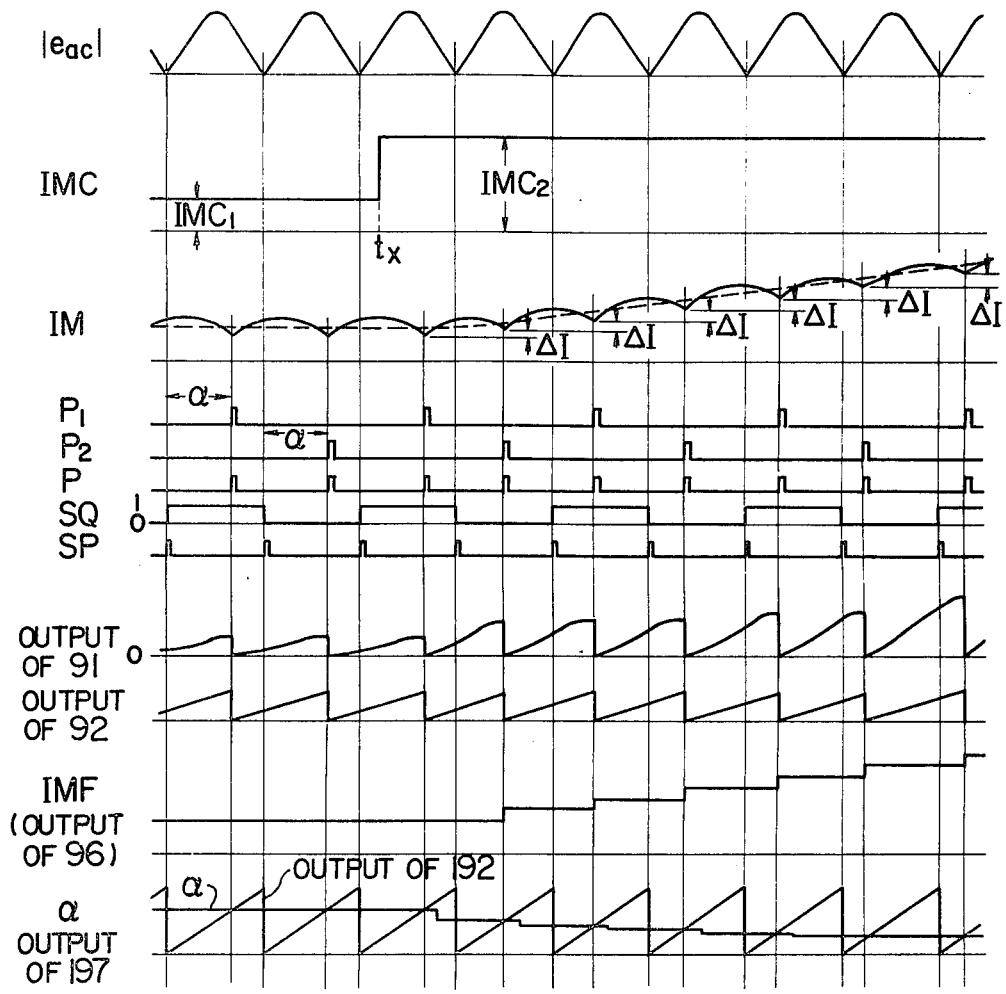

The steps of control by the embodiment shown in FIG. 1 will be described with reference to the waveforms shown in FIG. 7. For purposes of clear understanding, FIG. 7 is provided on the assumption that the mean current detecting circuit 9 employs the circuit arrangement shown in FIG. 5. The AC power voltage shown by $|e_{ac}|$ is supplied to the converter 1, producing the load current IM as shown by the solid line. The mean value of the load current is shown by the dashed line on the same chart. The reference or command mean load current IMC remains at a constant value IMC1 until time $t_x$, and it steps up to another constant value IMC2 after the time $t_x$. The adder 11 provides the difference between the reference value IMC and the actual mean current value IMF provided by the mean current detecting circuit 9, and it is amplified by the amplifier 13. Until time $t_x$, the mean value IMF approximates the reference value IMC1, and the amplifier 13 provides an error signal IMRC in proportion to the difference of the IMF and IMC1 without being saturated. This error signal IMRC and a variation signal IMRF of the actual load current variation provided by the variation detecting circuit 7 are applied to the adder 15. The output of the adder 15 is used to produce the phase signal $\alpha(n+1)$ in the calculating circuit 17. The phase signal $\alpha(n+1)$ is calculated in accordance with, for example, the following equation.

$$\alpha_D(n+1)=\alpha_D(n)+K_2\{K_1(IMC(n)-IMF(n))-IMRF(n)\}$$

$$\alpha(n+1)=180°-\alpha_D(n+1)$$

where suffix (n) indicates that the data has been sampled at a time of trigger pulse P, and suffix (n+1) indicates that the data should be sampled at a next trigger pulse; K1 and K2 are the gains of the amplifier 13 and the calculating circuit 17, respectively.

At time $t_x$, the reference value IMC is stepped up from IMC1 to IMC2, causing the adder 11 to produce a large error signal. This error signal is larger than $i_o$ at the input of the amplifier 13, which then provides a fixed output IMRC=$e_o$ irrespective of the magnitude of the error signal. In this state, the phase signal $\alpha(n+1)$ is calculated as follows.

$$\alpha_D(n+1)=\alpha_D(n)+K_2(e_o-IMRF(n))$$

$$\alpha(n+1)=180°-\alpha_D(n+1)$$

That is, the phase signal is produced so that the variation IMRF of the load current is constant. The variation IMRF of the load current IM is obtained as a difference $\Delta I$ of instantaneous load currents detected each time the ON-signal is issued to the converter, i.e. each time the trigger pulse P is issued, as described in connection with FIG. 4. The mean load current IMF is calculated by taking a ratio of the outputs of the integrators 91 and 92 at contiguous trigger pulses as can be seen from the description in connection with FIG. 5. The phase shift circuit 19 produces an output when the output of the counter 192 coincides with the setup phase signal $\alpha(n+1)$, and it is selectively outputted as P2 or P1 depending on whether the rectangular signal SQ is "0" or "1". As can be seen from FIG. 7, the load current variation and the mean load current are updated by the trigger pulse P, and thus the phase signal $\alpha(n+1)$ in response to the data following the trigger pulse P will be set after a time at which a new phase signal $\alpha(n+1)$ is produced.

As can be seen from FIG. 7, this embodiment allows the detection of the load current variation within one cycle following the alteration of the reference or command mean load current. This feature can be utilized so as to realize a stable and high response control. The advantages of the present invention are not lost by use of the filter circuit shown in FIG. 1 for detecting the mean load current. The mean load current detection using the filter circuit merely causes a slight delay in appearance of the load current variation in the mean load current, and this does not negate the merit of control using the variation of the load current.

Figure 8:
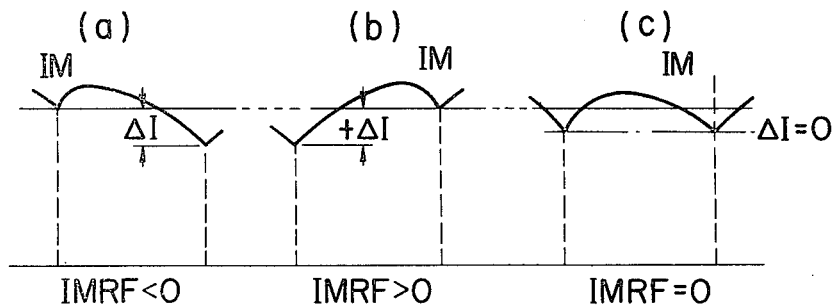

FIG. 8 shows three cases of the variation IMRF of the load current IM with the mean load current being identical: (a) for IMRF<0, (b) for IMRF>0 and (c) for IMRF=0. Due to the same mean current value IMF, if the load current were to be controlled solely using the difference between the reference value IMC and the mean value IMF, there would be no distinct phase signals in these cases. However, in consideration of the variation of the load current as in the present invention, more satisfactory phase signals can be obtained for individual cases.

The saturation characteristic of the amplifier 13 as shown in FIG. 1 allows the response to the reference value while maintaining a constant load current variation when the reference value is altered largely, and this feature is very effective for preventing a flashover in case where the load is a DC motor. However, it is needless to say that the saturation characteristic is not necessary when the variation of the load current need not be limited.

Figure 2:
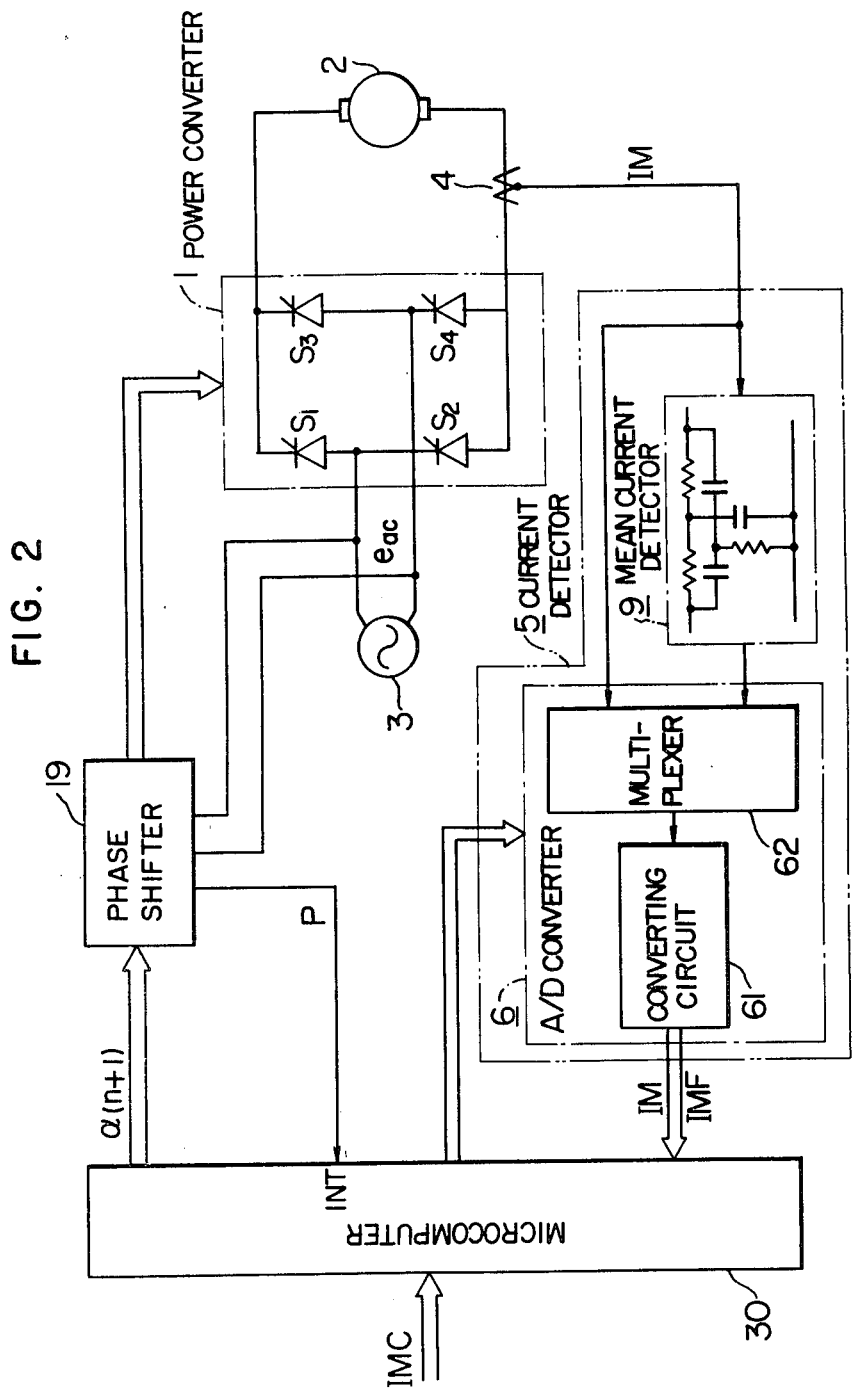
Figure 9:
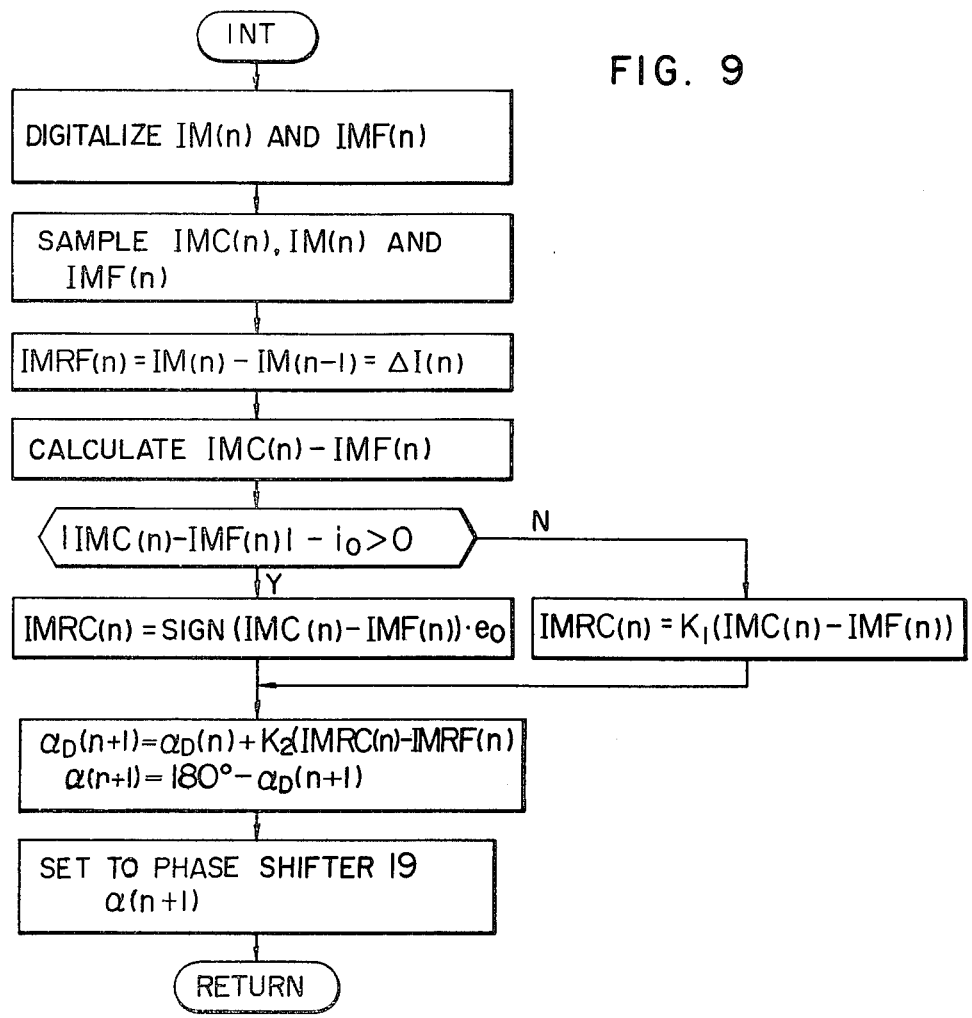
FIG. 9 is a block diagram showing the processing steps carried out by a computer for practicing the present invention.

FIG. 2 is a block diagram showing another embodiment of the present invention. The circuit arrangement is substantially identical to the embodiment of FIG. 1 with exception that portions including the adders 11 and 15, the amplifier 13 and the calculating circuit 17 in FIG. 1 are replaced with a microcomputer 30 in FIG. 2. Since this embodiment employs a microcomputer 30, the current detector 5 is equiped with an analog-to-digital converter 6. The A/D converter 6 consists of a converting circuit 61 and a multiplexer 62. Upon receipt of a command from the microcomputer 30, the A/D converter 6 selectively fetches the instantaneous load current value IM and mean current value IMF through the multiplexer 62 into the converting circuit 61 so that they are converted into digital data. The digitalized instantaneous current value IM and mean current value IMF are sent to the microcomputer 30. The variation of the load current can be calculated by the microcomputer, and therefore the variation detector 7 can be eliminated from the current detector 5. The calculation for the phase signal $\alpha(n+1)$ is carried out as an interrupt operation in response to the trigger pulse P as used in the embodiment of FIG. 1. The interrupt operation for the calculation is shown in the flowchart of FIG. 9, where data is designated in a manner similar to the case of FIG. 1. In FIG. 9, a suffix $(n-1)$ indicates that the data has been sampled at a time of the proceeding trigger pulse. The consequence of operation by the embodiment of FIG. 9 results in the same waveforms in the circuit as shown in FIG. 7.

Figure 3:
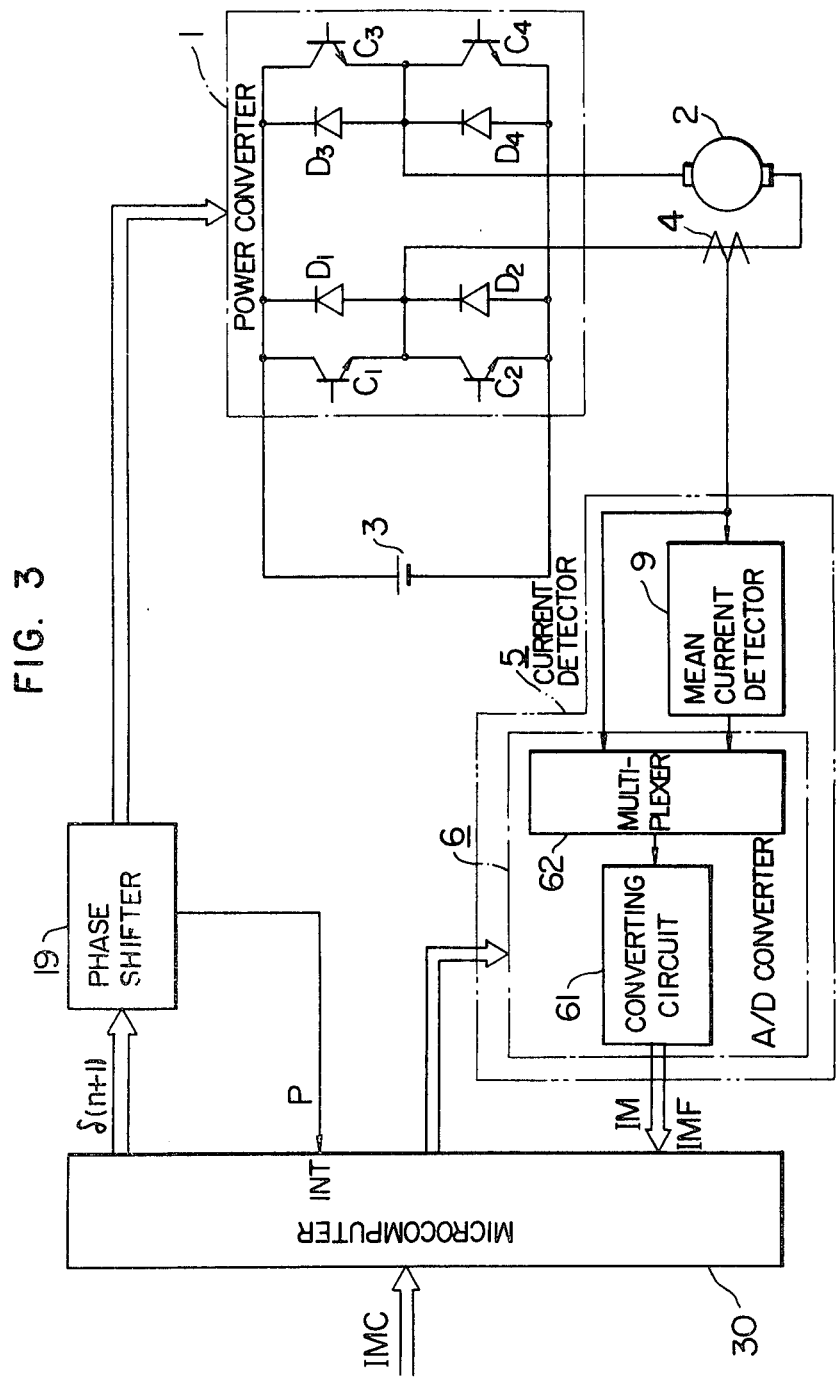
Figure 10:
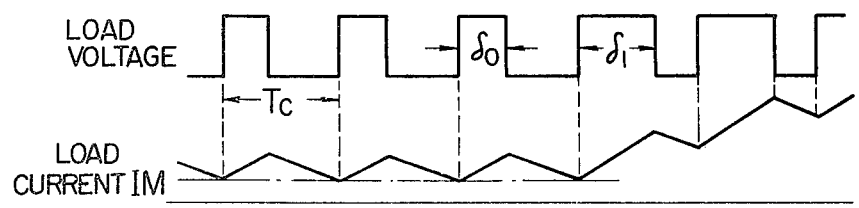

FIG. 3 is a block diagram showing still another embodiment of the present invention. In this embodiment, the converter 1 principally consists of choppers C1-C4 and diodes D1-D4, and a DC power source 3 is provided for the converter. The remaining portions are identical to those of the embodiment shown in FIG. 2. Chopper control is carried out, for example, by turning on the choppers C1 and C4 during a certain period $\delta$ within a constant control interval Tc for energizing the motor in one direction, while conversely turning on the choppers C2 and C3 during a certain period within the control interval for energizing the motor in another direction, whereby the motor speed is controlled by varying the ratio of these ON-periods. The application voltage to the load and the load current IM during the operation are shown in FIG. 10. Here, the ON-period $\delta$ is controlled as $\delta_o$ and $\delta_l$ so that the load current IM is controlled. In this case, by using the trigger pulse P, as mentioned in the previous embodiments, for initiating the control interval Tc or terminating the ON-period, control can be carried out in exactly the same manner, provided that the phase shift circuit 19 is set for the ON-period $\delta(n+1)$ by the microcomputer 30 and the converter 1 is supplied with the ON-signal which rises at th beginning of the control interval and falls on expiration of the period $\delta(n+1)$. Such phase shift circuits are commonly available and the explanation thereof will be omitted.

In the foregoing embodiments, the time for starting the calculation of the mean load current and the variation of the current is chosen at a time of issuing the ON-signal to the converter 1, thereby providing an advantage that the effect of the preceding ON-signal on the load current can be estimated most immediately. However, another timing is also possible as shown, for example, in FIG. 11, where initiation of the calculation is chosen at a time when the AC power voltage $e_{ac}$ crosses the zero level. FIGS. 11(a), 11(b) and 11(c) are waveforms showing comparatively the variation of the load current IM at points of ON-signals and at zero-cross points of the AC power voltage. In any case, it is apparent that the similar consequence is reached for the load current variation IMRF.

Incidentally, in case the interval between two following pulses is changed, it is a matter of course that more accurate current variation is obtained if the time interval is measured. In this case, it is desirable to calculate as the following. That is, the time interval $T_I(n)$ is given by the following equation on the basis of the phase signals $\alpha(n-1)$, $\alpha(n)$ and a period $T_o$ at which a phase signal $\alpha$ is generated when the ON-signal intervals are equal (10 m sec at the single-phase full-wave rectification of 50 Hz, 3.3 m sec at the three-phase full-wave rectification of 50 Hz).

$$T_I = K\omega(\alpha(n) - \alpha(n-1)) + T_o$$

where $K\omega$ is a coefficient for converting the phase angle into the time.

$$\text{Current variation } (n) = (IMRF(n))/(T_I(n)) \times T_o$$

Referring to FIG. 9, the above two calculations may be executed after the calculation for IMRF(n).

According to the present invention, as described above in detail, the variation of the load current is calculated based on the instantaneous load current detected in a predetermined timing and it is reflected in controlling the converter, whereby stable and high response control is achieved.

What is claimed is:

1. A method of controlling the electric current for a system including a power source, a load, and a converter provided between said power source and said load and comprising a regulating means capable of controlling the mean value of a load current supplied from the power source to the load in response to an ON-state or OFF-state control signal, said method comprising the steps of:
   (i) receiving a command value of the mean load current;
   (ii) detecting the mean load current;
   (iii) detecting the instantaneous value of the load current with a predetermined timing at successive points in time;
   (iv) calculating the difference between said command value of the mean load current and said detected mean load current to produce a first differential calculation;
   (v) calculating the difference between two values of said detected instantaneous load current at the present point of time and at a preceding point of time to produce a second differential calculation; and
   (vi) determining the time point for providing said ON-state or OFF-state control signal based on the result of said first and second differential calculations.

2. A method of controlling the electric current according to claim 1, wherein said calculation for the instantaneous load current is timed to a point of time when said ON-state or OFF-state control signal is applied to said converter.

3. A method of controlling the electric current according to claim 1, wherein said detecting of the instantaneous load current is timed to a point of time when the commutation voltage of said converter is zero volt.

4. A method of controlling the electric current according to claim 1, wherein said mean load current is calculated as a mean value between points of time when said ON-state or OFF-state control signal is applied to said converter.

5. A method of controlling the electric current according to claim 1, wherein said mean load current is calculated as a mean value between points of time when the commutation voltage of said converter is zero volt.

6. A method of detecting the electric current for a system including a power source, a load, and a converter provided between said power source and said load and comprising a regulating means capable of controlling the mean value of a load current supplied from the power source of the load in response to an ON-state or OFF-state control signal, said method comprising the steps of:
   (i) detecting the mean value of the load current; and
   (ii) detecting the variation of the load current by detecting the instantaneous load current at successive points in time and calculating the difference between instantaneous load currents detected at the present point of time and at a preceding point of time, said detection for the instantaneous load current being carried out each time said ON-state or OFF-state control signal is issued.

7. A method of detecting the electric current according to claim 6, wherein the variation of the load current is calculated on the basis of the instantaneous load currents detected at each time point when the commutation voltage of said converter is zero volt.

8. A method of detecting the electric current according to claim 7, wherein said mean load current is detected by calculating the mean value of the load current detected between points of time when the commutation voltage of said converter is zero volt.

9. A method of detecting the electric current according to claim 6, wherein said mean load current is detected by calculating the mean value of the load current detected between points of time when said ON-state or OFF-state control signal is issued.

10. An apparatus for controlling the electric current for a system including a power source, a load, and a converter provided between said power source and said load and comprising a regulating means capable of controlling the mean value of the load current supplied from the power source to the load in response to an ON-state or OFF-state control signal, said apparatus comprising:
    (i) means for receiving a command value of the mean load current;
    (ii) means for detecting the mean value of the load current;
    (iii) means for detecting the instantaneous value of the load current with a predetermined timing at successive points in time;
    (iv) first calculating means for calculating the difference between said command value of the mean load current and said detected mean current;
    (v) second calculating means for calculating the difference between two instantaneous currents detected at the present point of time and at a preceding point of time; and
    (vi) means for determining the timing for providing said ON-state or OFF-state control signal based on the result of said differential calculations by said first and second calculating means.

11. An apparatus for controlling the electric current according to claim 10, wherein said detecting of the instantaneous load current is timed to a point of time when said ON-state or OFF-state control signal is applied to said converter.

12. An apparatus for controlling the electric current according to claim 10, wherein said detecting of the instantaneous load current is timed to a point of time when the commutation voltage of said converter is zero volt.

13. An apparatus for controlling the electric current according to claim 10, wherein said mean load current is calculated as a mean value between points of time when said ON-state or OFF-state control signal is given to said converter.

14. An apparatus for controlling an electric current according to claim 10, wherein said mean load current is calculated as a mean value between points of time when the commutation voltage of said converter is zero volt.

15. A means for detecting the electric current for a system including a power source, a load, and a converter provided between said power source and said load and comprising a regulating means capable of controlling the mean value of the load current supplied from the power source to the load in response to an ON-state or OFF-state control signal, said means comprising:
    (i) means for detecting the mean value of the load current; and
    (ii) means for detecting the variation of the load current by detecting the instantaneous load current at successive points in time and calculating the difference between instantaneous load currents detected at the present point of time and at a preceding point of time, said instantaneous load current being detected at each time point when said ON-state or OFF-state control signal is issued.

16. A means for detecting the electric current according to claim 15, wherein said variation of said load current is calculated on the basis of the instantaneous load currents detected at points of time when the commutation voltage of said converter is zero volt.

17. A means for detecting the electric current according to claim 16, wherein said mean load current is detected by calculating the mean value of the load current detected between points of time when the commutation voltage of said converter is zero volt.

18. A means for detecting the electric current according to claim 15, wherein said mean load current is detected by calculating the mean value of the load current detected between points of time when said ON-state or OFF-state control signal is issued.

* * * * *